(12) United States Patent
Croy et al.

(10) Patent No.: US 11,804,588 B2
(45) Date of Patent: Oct. 31, 2023

(54) LOW COBALT LAYERED OXIDE MATERIALS FOR LITHIUM ION BATTERY ELECTRODES

(71) Applicant: UCHICAGO ARGONNE, LLC, Chicago, IL (US)

(72) Inventors: Jason R. Croy, Plainfield, IL (US); Mahalingam Balasubramanian, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 432 days.

(21) Appl. No.: 16/937,806

(22) Filed: Jul. 24, 2020

(65) Prior Publication Data

US 2022/0029149 A1 Jan. 27, 2022

(51) Int. Cl.
| H01M 4/134 | (2010.01) |
| H01M 4/131 | (2010.01) |
| H01M 10/0525 | (2010.01) |
| H01M 4/525 | (2010.01) |
| H01M 4/505 | (2010.01) |
| H01M 4/36 | (2006.01) |

(52) U.S. Cl.
CPC .......... *H01M 4/134* (2013.01); *H01M 4/131* (2013.01); *H01M 4/366* (2013.01); *H01M 4/505* (2013.01); *H01M 4/525* (2013.01); *H01M 10/0525* (2013.01)

(58) Field of Classification Search
CPC .......... H01M 4/131–134; H01M 4/36; H01M 4/505; H01M 4/525; H10M 10/0525
See application file for complete search history.

(56) References Cited

U.S. PATENT DOCUMENTS

| 10,714,745 B2 | 7/2020 | Lu et al. |
| 2014/0234717 A1* | 8/2014 | Christensen ........ H01M 4/1391 429/223 |

OTHER PUBLICATIONS

Kim et al, "Electrochemical and Structural Properties of xLi2M'O3 (1-x)LiMn0.5Ni0.5O2 Electrodes for Lithium Batteries," Chemistry of Materials Journal, vol. 16, Issue 10, p. 1996-2006. (Year: 2004).*

(Continued)

*Primary Examiner* — Allison Bourke
*Assistant Examiner* — Bethany C Bouchard
(74) *Attorney, Agent, or Firm* — OLSON & CEPURITIS, LTD.

(57) ABSTRACT

Stabilized layered lithium metal oxide cathode materials are described which include excess lithium, Ni, Mn, and at least one other metal ion. The materials comprise a layered LiMO$_2$-type material in which M comprises a combination of Ni, Mn, and at least one other metal ion that includes less than about 6 mol % Co; and which has about 1 to 6 percent excess lithium. In one embodiment, the stabilized lithium metal oxide cathode material comprises a composition having the empirical formula xLi$_2$MnO$_3$·(1−x)LiNi$_{0.5+\delta/2}$Mn$_{0.5-\delta}$Co$_{\delta/2}$O$_2$, wherein 0<x≤0.1; and 0≤δ≤0.2. In another embodiment, the stabilized lithium metal oxide cathode material comprises a composition having the empirical formula Li$_{1+3y}$[Ni$_a$Mn$_b$M'$_c$]$_{1-y}$O$_2$, wherein M' is one of more metal selected from the group consisting of Co, Al, Fe, Mg, and Ti; 0<y≤0.02; 0.85≤a≤0.96; 0.03≤b≤0.1; and 0.01≤c≤0.1.

9 Claims, 6 Drawing Sheets

(56) References Cited

OTHER PUBLICATIONS

Ahmed, S. et al., Cost of Automotive Lithium-Ion Batteries Operating At High Upper Cutoff, Journal of Power Sources, 103, 56-65 (2018).
Arora, P. et al., Battery Separators, Chemical Review 104, 4419-4462 (2004).
Croy, J.R. et al., Review of the U.S. Department of Energy's "Deep Dive" Effort to Understand Voltage Fade in Li- and Mn-Rich Cathodes, Acc. Chem. Res. 48, 2813-2821 (2015).
Jow et al. (Eds), Electrolytes for Lithium and Lithium-Ion Batteries; Chapter 1, pp. 1-92; Springer, New York, NY (2014).
Jow et al. (Eds), Electrolytes for Lithium and Lithium-Ion Batteries; Chapter 2, pp. 93-166; Springer, New York, NY (2014).
Jow et al. (Eds), Electrolytes for Lithium and Lithium-Ion Batteries; Chapter 3, pp. 167-182; Springer, New York, NY (2014).
Jow et al. (Eds), Electrolytes for Lithium and Lithium-Ion Batteries; Chapter 4, pp. 209-266; Springer, New York, NY (2014).
Long, B.R. et al., Enabling High-Energy, High-Voltage Lithium-Ion Cells: Standardization of Coin-Cell Assembly, Electrochemical Testing, and Evaluation of Full Cells, Journal of The Electrochemical Society 163 (14), A2999-A3009 (2016).
Ma, D. et al., Si-Based Anode Materials For Li-Ion Batteries: A Mini Review, Nano-Micro Letters 6 (4), 347-358 (2014).
Mekonnen, Y. et al., A Review of Cathode and Anode Materials For Lithium-Ion Batteries, Southeast Con 2016, Norfolk, VA, pp. 1-6, IEEE (2016).
Nestler, T. et al., Separators-Technology Review: Ceramic Based Separators For Secondary Batteries, AIP Conference Proceedings 1597, 155-184 (2014).
Xiao, Y. et al. Insights into the origin of lithium/nickel ions exchange in layered $Li(Ni_xMn_yCo_z)O_2$ Cathode Materials, Nano Energy 49 (77) (2019).
Zhu, B. et al., Towards High Energy Density Lithium Battery Anodes: Silicon and Lithium, Chemical Science 10, 7132-7148 (2019).

* cited by examiner

LOW COBALT LAYERED OXIDE MATERIALS FOR LITHIUM ION BATTERY ELECTRODES

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials useful for lithium-based battery systems. More particularly, the invention relates to layered lithium metal oxide materials comprising low levels of cobalt.

BACKGROUND

State-of-the-art, lithium-ion batteries used in electric vehicle applications rely on transition metal (TM) oxide chemistries such as $LiNi_{0.80}Co_{0.15}Al_{0.05}O_2$ (NCA) or $Li_{1+x}Ni_{0.a}Mn_{0.b}Co_{0.c}O_2$ (NMC-abc), where x is typically at, or slightly above, the stoichiometric value of x=0. These current generation cathodes achieve practical oxide specific energy densities of about 650 Wh/kg$^{-1}$, and the intrinsically high volumetric energies (Wh L$^{-1}$) of Ni-rich compositions (a≥0.5) has led to interest in developing cathodes such as NMC-811. Although progress has been steady, several major concerns exist with respect to future implementation of NCA and Ni-rich NMC cathodes. Specifically, in order to meet DOE/USABC goals for PHEV and EV applications, specific oxide energy densities of about 800 Wh kg$^{-1}$ or more are desirable. NMC-based compositions have shown promise to this end but only under higher voltage operation than is currently possible.

High voltage can be defined, in a materials sense, as the onset voltage of oxygen sublattice instabilities ($V_{ox}$). $V_{ox}$ is highly dependent on cathode and electrolyte composition and occurs at states of charge (SOCs) between about 4.2-4.6 V (vs. Li/Li$^+$). As such, the definition of high-voltage is cathode-specific, where similar SOCs for different cathodes occur at different voltages. Importantly, higher nickel content NMCs (e.g., NMC-811) have lower onset voltages. High-voltage oxygen instabilities are particularly critical issues for cathode surfaces and can lead to oxygen loss, facile transition metal (TM) dissolution, surface reconstructions, reactions with organic electrolytes, and thermal runaway. It is therefore widely recognized that stabilization of cathode surfaces is essential if high-voltage NMC-based cells are to be realized in electric vehicle applications.

Coupled to materials issues associated with high-energy cells is the ever-growing recognition of an unsustainable reliance on security-critical materials. For NMC cathodes, the most important of these materials is cobalt. High demand, fluctuating prices, and scrutiny over the ethical and geopolitical implications related to cobalt mining has attracted interest in the possibility of competitive, cobalt-free oxides. Therefore, it is desirable to move away from cobalt-containing chemistries and much effort has recently been focused on revisiting the challenges of LiNiO$_2$-based materials.

One of the key issues with the prototypical Ni-rich cathode, LiNiO$_2$, is the tendency for Li$^+$/Ni$^{2+}$ exchange leading to non-layered Li$_{1-x}$Ni$_{1+x}$O$_2$-type local environments as a result of Ni$^{3+}$ instabilities at high temperatures; the subsequent electrochemical performance and reversibility worsening with increasing exchange. That being said, it has been known for many years that a highly layered structure can be synthesized (e.g., approximately $Li_{0.98}Ni_{1.02}O_2$), without the need for substitutes (e.g., Co, Al, Mg, and the like), by careful control of synthesis conditions (oxygen, temperature, time). However, subsequent cycling to high capacities of pure, layered LiNiO$_2$ results in irreversible phase changes similar to those of layered LiCoO$_2$. In addition, the thermal stability of charged LiNiO$_2$ cathodes is much lower than desirable from a safety perspective and cathode surface instabilities are a problem even at modest voltages. Historically, the main strategy to overcome these issues has been the use of various substitutions. In particular, Co is so far the only substitute for Ni that can be incorporated into LiNiO$_2$ at sufficiently high levels (sufficient in the sense that, for practical applications, pure LiNiO$_2$ shortcoming, e.g., cycling and thermal stability, must be adequately suppressed while still maintaining good electrochemical performance). Elements such as Mg, Al, and Mn can be substituted at relatively low levels and can yield marginally suitable materials, however, poor kinetics and low capacities can result.

Accordingly, one of the main reasons Co is still heavily utilized is because it can help adequately suppress pure LiNiO$_2$ behavior while enabling good electrochemical performance, if introduced on a sufficient level (about 10-20%). Al has been noted to increase structural stability and various combinations of Ni, Mn, and Co can be used to simultaneously optimize thermal and electrochemical properties. Systematic studies with respect to such variations are responsible for the NCA and NMC compositions in widespread use today. Although NCA and Ni-rich NMCs still represent the best options for near-term advancements, Co plays a necessary role in practical application by altering their properties adequately away from pure LiNiO$_2$ without sacrificing performance.

Alternatives to LiNiO$_2$-based materials (e.g. >80% Ni) might be found in NiMn-based compositions such as LiNi$_{0.5}$Mn$_{0.5}$O$_2$. Mn is known to increase the thermal stability of layered oxides, is significantly less expensive than Co or Ni, and is one of the earth's most abundant elements. Although Mn can also introduce adverse effects, as discussed above, Mn-rich cathode materials can achieve good performance. The most popular strategy followed thus far in addressing the problems associated with cobalt-containing layered lithium metal oxides has been the development of LiNiO$_2$-like, Ni-rich, layered LiMO$_2$ (M=Ni, Mn, Co; NMC) oxides with low Mn and Co contents, e.g., NMC-811 (LiNi$_{0.8}$Mn$_{0.1}$Co$_{0.1}$O$_2$). However, safety, cycle-life, and even cost could remain critical barriers to the success of such cathode materials. In view of these issues, there in an ongoing need for new lithium metal oxide cathode materials. The materials and methods described herein address this need.

SUMMARY

The current interest in developing low-cobalt oxides for lithium-ion cathodes has sparked renewed interest in Ni-rich, LiNiO$_2$-like materials. An alternative strategy to low-cobalt, LiNiO$_2$-based oxides is described herein, in the form of compositions based on LiNi$_{0.5}$Mn$_{0.5}$O$_2$ with optimized ratios of Li:Mn:Ni and added Co (or optionally another metal). These compositions provide well-layered oxides that contain Ni and Mn in significant amounts for stability while incorporating minimal amounts of Co. Electrochemical and structural data show that these cathodes are structurally similar to typical NMCs, but with a much lower cobalt content, and can cycle in a stable manner at high voltage. Stabilized layered lithium metal oxide cathode materials are described which include Ni, Mn, and at least one other metal ion, and excess lithium. The materials comprise a layered LiMO$_2$-type lithium metal oxide (LMO) material in which M comprises a combination of Ni, Mn, and at least one other metal ion that includes less than about 6 mol % Co; and which has about 1 to 6 percent excess lithium. One embodiment described herein shows performance on par with NMC-622 but contains about 15% less Co. The manganese content and excess lithium enable the other metal ion (e.g., cobalt, aluminum or a combination thereof) to stabilize the layered structure of the LMO by reducing the tendency for Ni/Li exchange in the crystal lattice of the material.

In one embodiment, the stabilized lithium metal oxide cathode material comprises a composition having the empirical formula $xLi_2MnO_3 \cdot (1-x)LiNi_{0.5+\delta/2}Mn_{0.5-\delta}Co_{\delta/2}O_2$, wherein $0<x\leq 0.1$; and $0\leq\delta\leq 0.2$ (preferably $0<\delta\leq 0.2$).

In another embodiment, the stabilized lithium metal oxide cathode material comprises a composition having the empirical formula $Li_{1+3y}[Ni_aMn_bM'_c]_{1-y}O_2$, wherein M' is selected from the group consisting of Co, Al, Fe, Mg, and Ti; $0<y\leq 0.02$; $0.85\leq a\leq 0.96$; $0.03\leq b\leq 0.1$; and $0.01\leq c\leq 0.1$.

The following non-limiting embodiments of the materials and methods described herein are provided below to illustrate certain aspects and features of the compositions and methods described herein.

Embodiment 1 is a layered LMO comprising a lithium metal oxide of empirical formula $xLi_2MnO_3 \cdot (1-x)LiNi_{0.5+\delta/2}Mn_{0.5-\delta}Co_{\delta/2}O_2$, wherein $0<x\leq 0.1$; and $0\leq\delta\leq 0.2$.

Embodiment 2 comprises the layered LMO material of embodiment 1, wherein $0.02\leq x\leq 0.08$.

Embodiment 3 comprises the stabilized layered LMO material of embodiment 1 or 2, wherein $0.03\leq x\leq 0.07$.

Embodiment 4 comprises the stabilized layered LMO material of any one of embodiments 1 to 3, wherein $0.05\leq\delta\leq 0.2$.

Embodiment 5 comprises the stabilized layered LMO material of any one of embodiments 1 to 4, wherein $0.07\leq\delta\leq 0.15$.

Embodiment 6 comprises the stabilized layered LMO material of any one of embodiments 1 to 5, wherein x is about 0.05, and δ is about 0.1.

Embodiment 7 is a layered LMO comprising a lithium metal oxide of empirical formula $Li_{1+3y}[Ni_aMn_bM'_c]_{1-y}O_2$, wherein M' is selected from the group consisting of Co, Al, Fe, Mg, and Ti; $0<y\leq 0.02$; $0.85\leq a\leq 0.96$; $0.03\leq b\leq 0.1$; and $0.01\leq c\leq 0.1$.

Embodiment 8 comprises the layered LMO material of embodiment 7, wherein $0.005\leq y\leq 0.015$.

Embodiment 9 comprises the stabilized layered LMO material of embodiment 7 or 8, wherein $0.9\leq a\leq 0.96$.

Embodiment 10 comprises the stabilized layered LMO material of any one of embodiments 7 to 9, wherein $0.05\leq b\leq 0.08$.

Embodiment 11 comprises an electrochemical cell comprising an anode, a cathode comprising the layered LMO material of any one of embodiments 1 to 10, an ion-conductive separator between the anode and the cathode, and an electrolyte comprising a lithium salt dissolved in a non-aqueous solvent contacting the anode, the cathode, and the separator.

Embodiment 12 comprises a battery comprising a plurality of the electrochemical cells of embodiment 11 electrically connected in series, in parallel, or in both series and parallel.

DETAILED DESCRIPTION

Figure 1:
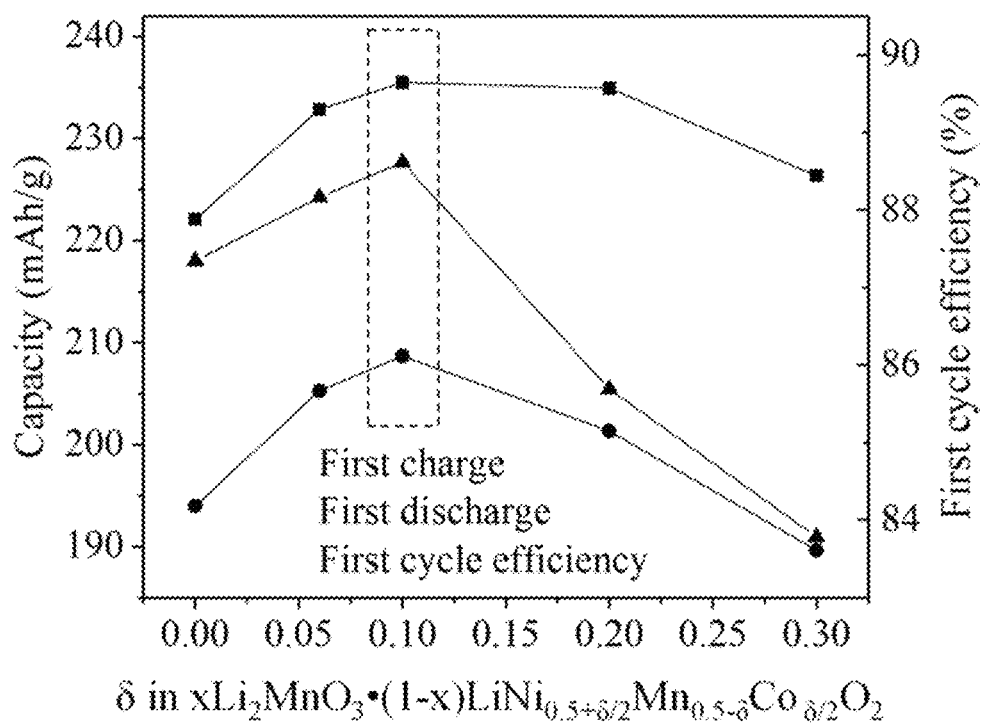
FIG. 1 shows plots of capacity (left axis) and first-cycle efficiency (right axis) versus δ in a series of the proposed $xLi_2MnO_3 \cdot (1-x)LiNi_{0.5+\delta/2}Mn_{0.5-\delta}Co_{\delta/2}O_2$ compositions where x was fixed at a nominal value of 0.05 and δ was varied in the range of $0\leq\delta\leq 0.3$.

A stabilized layered LMO cathode material has a roughly LiMO$_2$ stoichiometry and includes Ni, Mn, and Co (optionally substituted by another metal ion such as Al), and has a slight (1 to 6 percent) excess of lithium.

In one embodiment, the stabilized lithium metal oxide cathode material comprises a composition having the empirical formula $xLi_2MnO_3 \cdot (1-x)LiNi_{0.5+\delta/2}Mn_{0.5-\delta}Co_{\delta/2}O_2$, wherein $0<x\leq 0.1$; and $0\leq\delta\leq 0.2$ (preferably $0<\delta\leq 0.2$). In some embodiments, δ is about 0.1 to about 0.2, e.g., about 0.15. In some embodiments, x is about 0.08 to about 0.1, e.g., about 0.09. In one embodiment x is about 0.04 to about 0.06, e.g., about 0.05, and δ is about 0.07 to about 0.15, e.g., about 0.1. The stabilized lithium metal oxide cathode materials described herein have a predominately layered structure, albeit with some disorder with respect to Li$^+$ and Ni$^{2+}$ site mixing. Composite notation, e.g., $xLi_2MnO_3 \cdot (1-x)LiMO_2$, is used herein for convenience to conceptualize the manipulation of local ordering that can take place with respect to the ratio of elements present in a given composition, and is not intended to imply that the stabilized lithium metal oxide materials include integrated or secondary phases.

In another embodiment, the stabilized lithium metal oxide cathode material comprises a composition having the empirical formula $Li_{1+3y}[Ni_aMn_bM'_c]_{1-y}O_2$, wherein $0<y\leq0.02$; $0.85\leq a\leq0.96$; $0.03\leq b\leq0.1$; and $0.01\leq c\leq0.1$. M' can be Co, Al, Fe, Mg, Ti, or a combination of two or more thereof.

As used herein the term "lithium battery" refers to electrochemical cells and combinations of electrochemical cells in which lithium (e.g., lithium ion) shuttles between a Si anode and a cathode, and includes so-called full cells, as well as so-called half-cells (e.g. comprising a lithium metal anode).

Electrodes for lithium electrochemical cells typically are formed by coating a slurry of electrode active material in a solvent with a polymeric binder (e.g., PVDF) onto a current collector (e.g., metal foil, carbon fiber paper, and the like), and drying the coating to form the electrode. Some examples of electrode active materials can be found, e.g., in Mekonnen, Y., Sundararajan, A. & Sarwat, A. I. "A review of cathode and anode materials for lithium-ion batteries," *SoutheastCon* 2016, Norfolk, Va., pp. 1-6, (2016), which is incorporated herein by reference in its entirety.

The electrodes utilize binders to aid in adhering cathode active materials to the current collectors. In some cases, the binder comprises a poly(carboxylic acid) or a salt thereof (e.g., a lithium salt), which can be any poly(carboxylic acid), such as poly(acrylic acid) (PAA), poly(methacrylic acid), alginic acid, carboxymethylcellulose (CMC), poly(aspartic acid) (PAsp), poly(glutamic acid) (PGlu), copolymers comprising poly(acrylic acid) chains, poly(4-vinylbenzoic acid) (PV4BA), and the like, which is soluble in the electrode slurry solvent system. A preferred poly(carboxylic acid) is poly(acrylic acid). The poly(carboxylic acid) can have a $M_n$, as determined by GPC, in the range of about 1000 to about 450,000 Daltons (preferably about 50,000 to about 450,000 Daltons, e.g., about 130,000 Daltons). In some other embodiments, the binder may comprise anionic materials or neutral materials such as fluorinated polymer such as poly(vinylidene difluoride) (PVDF; also referred to as polyvinylidene difluoride), carboxymethylcellulose (CMC), and the like.

Lithium-ion electrochemical cells described herein comprise a cathode (positive electrode), an anode (negative electrode), and an ion-conductive separator between the cathode and anode, with the electrolyte in contact with both the anode and cathode, as is well known in the battery art. It is well understood that the function of a given electrode switches from being a positive or negative electrode depending on whether the electrochemical cell is discharging or charging. Nonetheless, for the sake of convenient identification, the terms "cathode" and "anode" as used herein are applied as an identifier for a particular electrode based only on its function during discharge of the electrochemical cell.

Cathodes typically are formed by combining a powdered mixture of the active material and some form of carbon (e.g., carbon black, graphite, or activated carbon) with a binder such as (polyvinylidene difluoride (PVDF), carboxymethylcellulose, and the like) in a solvent (e.g., N-methylpyrrolidone (NMP) or water) and the resulting mixture is coated on a conductive current collector (e.g., aluminum foil) and dried to remove solvent and form an active layer on the current collector.

The anode comprises a material capable of reversibly releasing and accepting lithium during discharging and charging of the electrochemical cell, respectively. Typically, the anode comprises a carbon material such as graphite, graphene, carbon nanotubes, carbon nanofibers, and the like, a silicon-based material such as silicon metal particles, a lead-based material such as metallic lead, a nitride, a silicide, a phosphide, an alloy, an intermetallic compound, a transition metal oxide, and the like. The anode active materials typically are mixed with a binder such as (polyvinylidene difluoride (PVDF), carboxymethyl cellulose, and the like) in a solvent (e.g., NMP or water) and the resulting mixture is coated on a conductive current collector (e.g., copper foil) and dried to remove solvent and form an active layer on the current collector.

In some embodiments the anode comprises silicon-containing particles, preferably combined with carbon particles. The silicon-containing particles can be silicon nanoparticles, silicon/silicon oxide (Si/SiOx) nanocomposite particles, silicon nanotubes, microporous silicon, an alloy or intermetallic compound of silicon with a metal such as magnesium, calcium, nickel, iron, or cobalt. Some examples of useful silicon-containing materials are discussed in Ma et al., *Nano-Micro Lett.*, 2014, 6(4):347-358, which is incorporated herein by reference in its entirety. Some other examples are mentioned in Zhu et al., *Chemical Science,* 2019 10, 7132, which is incorporated herein by reference in its entirety. Si/SiOx nanocomposite particles include e.g., materials described in co-owned, co-pending application Ser. No. 15/663,268 to Wenquan Lu et al., filed on Jul. 28, 2017 which is incorporated herein by reference in its entirety.

Preferably, the silicon-containing particles, when utilized in the anode, have an average size in the range of about 50 to about 200 nm, more preferably about 70 to about 150 nm. The carbon particles can be carbon microparticles or nanoparticles. Non-limiting examples of carbon materials include, e.g., carbon black, graphite, carbon nanotubes, carbon nanofibers, and graphene. Preferably, the electrode includes silicon and carbon particles in a respective weight ratio (Si:C) of about 1:9 to about 9:1, more preferably about 1:5 to about 8:1. The binder typically comprises about 5 to about 30 wt %, preferably about 10 to about 20 wt %, of the active material coated on the current collector, based on the combined weight of the silicon, carbon and binder in the finished electrode (i.e., after drying). The loading of silicon and carbon particles and binder on the current collector typically is in the range of about 0.6 to about 3.2 mg/cm², preferably about 0.8 to about 2.7 mg/cm².

In electrochemical cell and battery embodiments described herein, the electrolyte comprises an electrolyte salt (e.g., an electrochemically stable lithium salt or a sodium salt) dissolved in a non-aqueous solvent. Any lithium electrolyte salt can be utilized in the electrolyte compositions for lithium electrochemical cells and batteries described herein, such as the salts described in Jow et al. (Eds.), *Electrolytes for Lithium and Lithium-ion Batteries*; Chapter 1, pp. 1-92; Springer; New York, N.Y. (2014), which is incorporated herein by reference in its entirety.

Non-limiting examples of lithium salts include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiB(C$_2$O$_4$)$_2$ or "LiBOB"), lithium difluoro(oxalato)borate (LiF$_2$BC$_2$O$_4$ or "LiDFOB"), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, combinations of two or more thereof, and the like. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between an anode and a cathode, and includes so-called full cells with an anode material (e.g., graphite) that can accommodate intercalated lithium ions, as well as so-called half-cells in which the anode is lithium metal. In some embodiments, the lithium salt is present in the electrolyte at a concentration in the range of about 0.1 M to about 5 M, e.g., about 0.5 M to 2 M, or 1 M to 1.5 M. A preferred lithium salt is $LiPF_6$.

The non-aqueous solvent for the electrolyte compositions include the solvents described in Jow et al. (Eds.), *Electrolytes for Lithium and Lithium-ion Batteries*; Chapter 2, pp. 93-166; Springer; New York, N.Y. (2014), which is incorporated herein by reference in its entirety. Non-limiting examples of solvents for use in the electrolytes include, e.g., an ether, a carbonate ester (e.g., a dialkyl carbonate or a cyclic alkylene carbonate), a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds.

In some embodiments, the non-aqueous solvent for a lithium electrochemical cell as described herein can be an ionic liquid. Any electrochemically stable ionic liquid solvent can be utilized in the electrolytes described herein, such as the solvents described in Jow et al. (Eds.), *Electrolytes for Lithium and Lithium-ion Batteries*; Chapter 4, pp. 209-226; Springer; New York, N.Y. (2014), which is incorporated herein by reference in its entirety. In the case of lithium electrochemical cells and batteries, the ionic liquid can optionally include a lithium cation, and can act directly as the electrolyte salt.

The electrolyte compositions for lithium electrochemical cells and batteries described herein also can optionally comprise an additive such as those described in Jow et al. (Eds.), *Electrolytes for Lithium and Lithium-ion Batteries*; Chapter 3, pp. 167-182; Springer; New York, N.Y. (2014), which is incorporated herein by reference in its entirety. Such additives can provide, e.g., benefits such as SEI, cathode protection, electrolyte salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additive is present in the electrolyte at a concentration in the range of about 0.001 M to about 0.25 M, or about 0.01 M to about 0.1 M.

Electrochemical cells typically comprise a cathode, an anode typically comprising carbon, silicon, lead, metallic lithium, some other anode active material, or a combination thereof; and a porous separator between the cathode and anode, with the electrolyte in contact with the anode, the cathode and the separator.

A battery can be formed by electrically connecting two or more such electrochemical cells in series, parallel, or a combination of series and parallel. The electrodes described herein preferably are utilized as the anode in a full-cell configuration in lithium-ion and sodium-ion cells and batteries. Electrochemical cells and battery designs and configurations, anode and cathode materials, as well as electrolyte salts, solvents and other battery or electrode components (e.g., separator membranes, current collectors), which can be used in the electrolytes, cells and batteries described herein, are well known in the secondary battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

The separator component of the lithium-ion cell can be any separator used in the lithium battery art. A typical material is a porous polyalkylene material such as microporous polypropylene, microporous polyethylene, a microporous propylene-ethylene copolymer, or a combination thereof, e.g., a separator with layers of different polyalkylenes; a poly(vinylidene-difluoride)-polyacrylonitrile graft copolymer microporous separator; and the like. Examples of suitable separators are described in Arora et al., *Chem. Rev.* 2004, 104, 4419-4462, which is incorporated herein by reference in its entirety. In addition, the separator can be an ion-selective ceramic membrane such as those described in Nestler et al., *AIP Conference Proceedings* 1597, 155 (2014), which is incorporated herein by reference in its entirety.

Processes used for manufacturing lithium cells and batteries are well known in the art. The active electrode materials are coated on both sides of metal foil current collectors (typically copper for the anode and aluminum for the cathode) with suitable binders such as polyvinylidene difluoride and the like to aid in adhering the active materials to the current collectors. In the cells and batteries described herein, the cathode active material is the stabilized NMC, which optionally can be utilized with a carbon material such as graphite, and the anode active material typically is a lithium metal, carbon, and the like. Cell assembly typically is carried out on automated equipment. The first stage in the assembly process is to sandwich a separator between the anode and the cathode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed, the cell typically is subjected to at least one controlled charge/discharge cycle to activate the electrode materials and in some cases form a solid electrolyte interface (SEI) layer on the anode. This is known as formation cycling. The formation cycling process is well known in the battery art and involves initially charging with a low voltage (e.g., substantially lower that the full-cell voltage) and gradually building up the voltage. The SEI acts as a passivating layer which is essential for moderating the charging process under normal use. The formation cycling can be carried out, for example, according to the procedure described in Long et al. *J. Electrochem. Soc.*, 2016; 163 (14): A2999-A3009, which is incorporated herein by reference in its entirety. This procedure involves a 1.5 V tap charge for 15 minutes at C/3 current limit, followed by a 6-hour rest period, and then 4 cycles at C/10 current limit, with a current cutoff (i≤0.05 C) at the top of each charge.

Cathodes comprising the stabilized LMO described herein can be utilized with any combination of anode and electrolyte in any type of rechargeable battery system that utilizes a non-aqueous electrolyte.

Li/Ni exchange in $xLi_2MnO_3 \cdot (1-x)LiMO_2$ (M=Mn, Ni) compositions occurs almost exclusively within $LiMO_2$-type inhomogeneities. As such, contrary to previous reports, increasing x serves only to lower the overall fraction of those inhomogeneities not necessarily the Li/Ni exchange associated with them. A detailed discussion of the local structures that form in the presence of excess Li in Mn-containing cathodes is found in Croy, J. R.; Balasubramanian, M.; Gallagher K. G.; Burrell A. K. Review of the U.S. Department of Energy's "Deep Dive" Effort to Understand Voltage Fade in Li- and Mn-Rich Cathodes. *Acc. Chem. Res.*, 2015, 48, 2813-2821. In addition, it is well known that Co serves to help establish a more layered structure in NMC-type compositions that contain Mn and are rich in Ni. Furthermore, with the addition of a small amount of excess Li in the presence of Mn two things can be accomplished, (1) a few percent excess lithium has been shown to improve rate capability in layered oxides, and (2) a small amount of 'excess' capacity might be achieved. Also, excess Li and Mn, even at very low levels, leads to a strong tendency for that Li and Mn to charge order starting at low temperatures (about 400° C.) during synthesis, whereas complete layering of even pure $LiCo(Ni)O_2$ occurs above these temperatures. Therefore, small amounts of Co can be better utilized by 'directing' its effect to regions of interest (i.e., those prone to Li/Ni exchange) through the presence of a tailored amount of Li/Mn ordering (tailored in the sense that the benefit, e.g., layering, rate capability are desired without the drawbacks such as voltage fade). Following the above observations, cathodes of general composition $xLi_2MnO_3 \cdot (1-x) LiNi_{0.5+\delta/2}Mn_{0.5-\delta}Co_{\delta/2}O_2$, with x<0.10, are alternatives to $LiNiO_2$-based, low-cobalt oxides. The so-called composite notation is used here to convey the concept of the different nano-scale inhomogeneities present (e.g., $LiMn_6$) and how each might influence cathode properties with respect to 'excess' Li and added Co, as discussed.

The following non-limiting Examples are provided to illustrate certain features of the compositions and methods described herein.

Example 1. Preparation of Cathode Materials

Cathode powders were synthesized by oxalate co-precipitation using TM-oxalate precursors, $MC_2O_4$ (M=Mn, Ni, Co), prepared from $MnSO_4 \cdot H_2O$, $NiSO_4 \cdot 6H_2O$, $CoSO_4 \cdot 7H_2O$ and $C_2H_2O_4$ (oxalic acid). An aqueous solution consisting of the stoichiometric amounts of metal sulfates was added under stirring into a solution of sodium oxalate. The solution was stirred for about 3 hours at about 70° C., filtered, washed, and dried in air at about 110° C. The dried powders were thoroughly mixed with stoichiometric amounts of lithium carbonate and annealed at about 900° C. for about 24 hours in air.

Example 2. Preparation of Cathode Electrodes

Cathode electrodes for electrochemical tests were prepared by coating a slurry containing 84 wt % of the oxide powder, 8 wt % SUPER P carbon, and 8 wt % poly (vinylidene difluoride) (PVDF) binder in N-methyl-2-pyrrolidone (NMP) on Al foil. 2032 coin-cells were assembled in a glove box under an inert argon atmosphere. The cells contained metallic lithium anodes and 1.2 M $LiPF_6$ in a 3:7 (w/w) mixture of ethylene carbonate (EC) and ethyl methyl carbonate (EMC). Cells were cycled at 15 mA $g^{-1}$, unless otherwise stated, between 2.0-4.6 V for the first cycle and, during subsequent cycles, between 2.0-4.45 V with a 30 min trickle charge at the top of each charge.

Example 3. Electrochemical and Spectral Evaluation of Cathode Materials

FIG. 1 shows a plot of capacity (left axis) and first-cycle efficiency (right axis) versus δ in a series of the proposed $xLi_2MnO_3 \cdot (1-x)LiNi_{0.5+\delta/2}Mn_{0.5-\delta}Co_{\delta/2}O_2$ compositions where x was fixed at a nominal value of 0.05 and δ was varied in the range of 0≤δ≤0.3. The first-cycle data shown was conducted between 4.6-2.0V (Li/Li⁺) at about 20 mA $g^{-1}$ (active oxide). As can be observed, a value of δ=0.10, giving an overall nominal composition of $0.05Li_2MnO_3 \cdot 0.95LiNi_{0.55}Mn_{0.40}Co_{0.05}O_2$, gave the best performance in terms of capacity and efficiency. Subsequent ICP-MS analysis revealed a slightly lower Mn content and a slightly higher Ni content than nominal giving approximately $Li_{1.027}Ni_{0.61}Mn_{0.34}Co_{0.06}O_y$ (where the value of y is sufficient to balance the positive charges of the Li, Ni, Mn, and Co cations, e.g., y is slightly greater than 2). This composition was chosen for detailed studies as described below and is referred to hereafter as low-cobalt NMC (LC-NMC).

Figure 2:
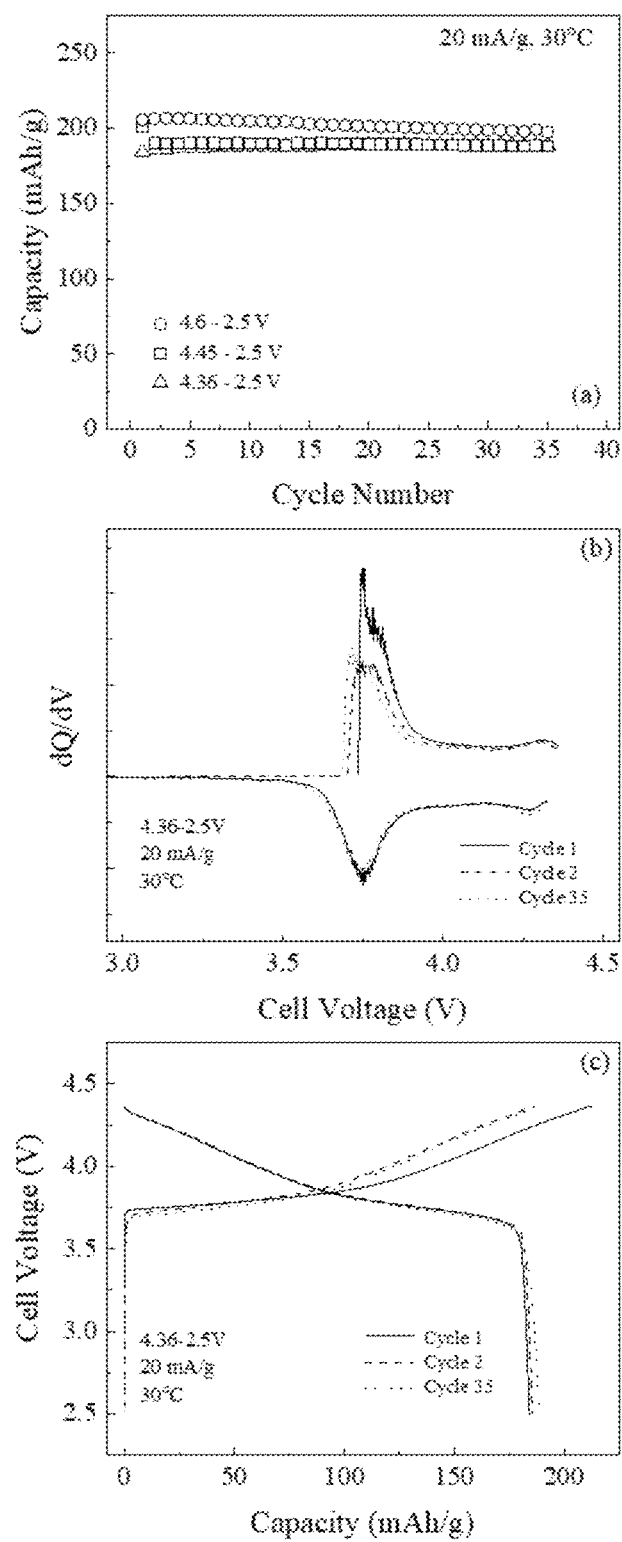
FIG. 2 shows (a) plots of capacity vs. cycling for the first 35 cycles of the LC-NMC composition in voltage windows of 4.6-2.5 V (circles), 4.45-2.5 V (after a 1$^{st}$ cycle to 4.6V, squares), and 4.36-2.5 V (triangle), (20 mA g$^{-1}$, 30° C.); (b) dQ/dV plots of the 4.36-2.5 V data in (a); and (c) Voltage profiles for cycles 1, 2, and 35 for the data in (b).

FIG. 2, panel (a) shows capacity vs. cycling for the first 35 cycles of the LC-NMC composition in voltage windows of 4.6-2.5 V, 4.45-2.5 V, and 4.36-2.5 V, (20 mA $g^{-1}$, 30° C.). Cycling between 4.6-2.5 V (circles) gives an initial capacity of about 205 mAh $g^{-1}$ with modest capacity fade (about 7 mAh $g^{-1}$ after 35 cycles). Following a first cycle between 4.6-2.5 V, subsequent tests were conducted between 4.45-2.5 V (squares) on additional cells. While first-cycle capacities were the same, lowering the upper cutoff to 4.45 V for ageing cycles gave about 190 mAh $g^{-1}$ of capacity and eliminated the capacity fade. This voltage was chosen as it marks the end of the process occurring around 4.3 V of the dQ/dV (see FIG. 2, panel (b)), reminiscent of Li-staging/ordering transitions in well-layered oxides. Interestingly, cycling directly between 4.36-2.5 V (triangles, FIG. 2 panel (a)) gives virtually the same capacity (about 188 mAh $g^{-1}$) and cycling stability as the 4.45 V upper cutoff. Corresponding dQ/dV and voltage profiles are shown for the 4.36-2.5 V window in FIG. 2, panels (b) and (c), respectively. Voltage profiles at 4.6 and 4.45 V upper cutoffs (not shown) are identical except for polarization effects that are minimal for the 4.45 V case and slightly increased for the 4.6 V cutoff. As a note, the 4.6 V cutoff did not show clear signatures of an "activation" process/plateau (not shown) characteristic of typical Li—Mn-rich electrodes that contain high amounts of excess Li/Mn. This activation process has been shown to correlate with $LiMn_6$ ordering where the magnitude of the effect (plateau), and subsequent voltage fade/hysteresis, increased with increased ordering. The LC-NMC has an excess Li content of <5% and the extent of ordering is expected to be small.

Figure 3:
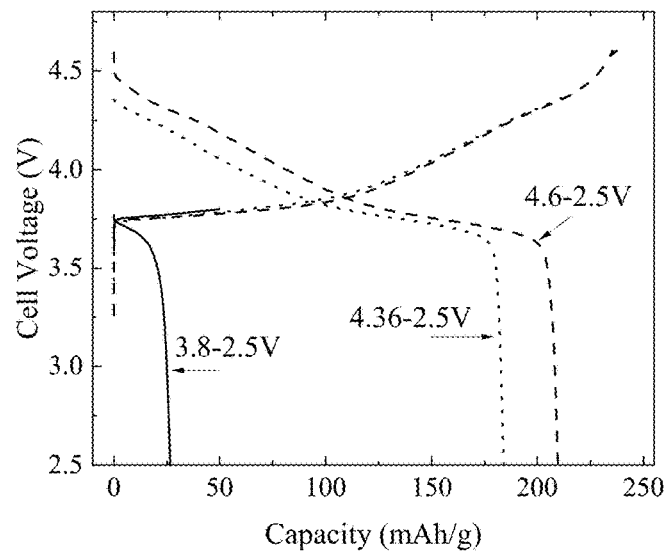
FIG. 3 shows first-cycle charge/discharge curves for the LC-NMC between various upper cutoff voltages.

The electrochemistry of FIG. 2 shows that the low cobalt composition has a first-cycle efficiency of about 87%, consistent with most layered NMCs. An interesting observation is that no matter what the upper cutoff voltage of the first-cycle charge is, this material has an irreversible capacity of about 27 mAh $g^{-1}$. For example, FIG. 3 shows voltage profiles for a first-cycle charge that was capacity limited to just 50 mAh g$^{-1}$ (about 3.8 V, solid line), followed by a discharge to 2.5 V, where a loss of about 27 mAh g$^{-1}$ can be observed. The same loss is observed when the first cycle is between about 4.36-2.5 V (dotted line). This same capacity loss is again observed when cycled over a wide voltage window of about 4.6-2.0 V (dashed line) showing that exposure to high voltage on the first charge does not induce additional capacity losses with respect to the lower voltage charge. Here it can also be noted that almost no capacity (about 1 mAh g$^{-1}$) was observed when discharging between 2.5-2.0 V. Similar capacity-loss behavior has previously been related to the kinetics at low states of charge of NMCs, and not structural damage and the data here show that the LC-NMC behaves in a similar manner. The results of the cycling window tests described above suggest that capacity fade in the 4.6-2.5 V window is largely due to surface effects and impedance rise with extended cycling and not to structural changes in the oxide itself. To verify this result, X-ray absorption spectroscopy experiments were carried out on the LC-NMC cathode.

X-ray absorption spectroscopy (XAS) experiments were carried out at beamline 20-BM-B of the Advanced Photon Source at Argonne National Laboratory. The incident beam was monochromatized using a Si(111) fixed-exit, double-crystal monochromator. Manganese, nickel, and cobalt foils were incorporated for energy calibration with the zero energy ($E_0$) defined according to Kraft et al. Spectra were acquired in transmission mode using gas ionization chambers as detectors. X-ray Absorption Near Edge Structure (XANES) and Extended X-ray Absorption Fine Structure (EXAFS) data were extracted with established methods using the ATHENA software package. The normalized EXAFS data were converted from energy to k-space and weighted by $k^3$. These data were then Fourier transformed to R-space and left uncorrected for photoelectron phase shifts. As such, distances in R-space are about 0.3-0.4 Å shorter than actual bond distances.

Figure 4:
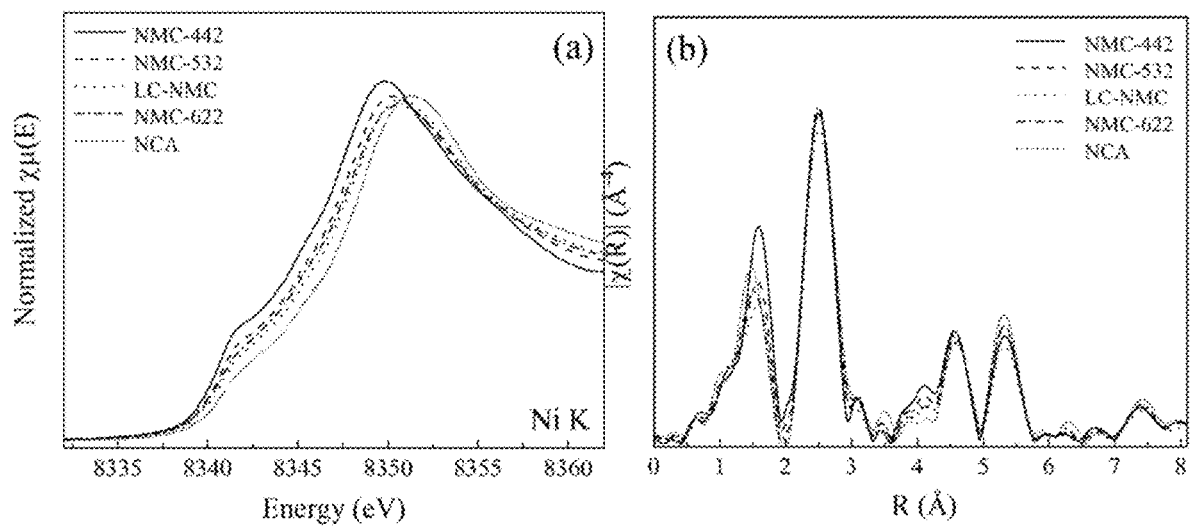
FIG. 4 shows (a) Ni K-edge XANES for the LC-NMC compared to data from standard NMC compositions and NCA; and (b) corresponding magnitudes of the Fourier transformed EXAFS of the samples in (a).

FIG. 4, panel (a) shows Ni K-edge XANES data for the LC-NMC sample compared to a series of industrially prepared NMCs including NMC-442, NMC-532, NMC-622, and NCA. Here, the NMC-442 represents Ni$^{2+}$ in a layered, R-3m oxide. The average Ni oxidation state increases with increasing Ni content from NMC-532 to NMC-622 and ending with NCA, having an average Ni oxidation state of 3+. The Ni K-edge of the LC-NMC is situated between NMC-532 and NMC-622, giving an average oxidation of roughly Ni$^{2.5+}$. Supporting evidence for the mixed Ni oxidation state and environment can also be found in the magnitude of the Fourier-transformed EXAFS shown in FIG. 4, panel (b). Notably, Ni$^{3+}$ ions in these oxides reside in Jahn-Teller distorted octahedra having two distinct Ni—O bond lengths. The NMC-442, having a majority of Ni$^{2+}$ ions with one Ni—O bond length, thus gives a large amplitude for the Ni—O bonds at about 1.5 Å (not corrected for photoelectron wave shift) in FIG. 4, panel (b). For the NMC standard samples, having various proportions of Ni$^{2+/3+}$, the amplitudes are damped due to the convolution of the two different Ni—O bonds. In general, the LC-NMC sample is indicative of layered NMCs such as NMC-532 and NMC-622, but with much less Co. Mn and Co K-edges (not shown) of the LC-NMC match those of the Mn and Co K-edges from the NMC-442, 532, and 622 samples, which all closely overlap (e.g., Mn$^{4+}$ and Co$^{3+}$).

Figure 5:
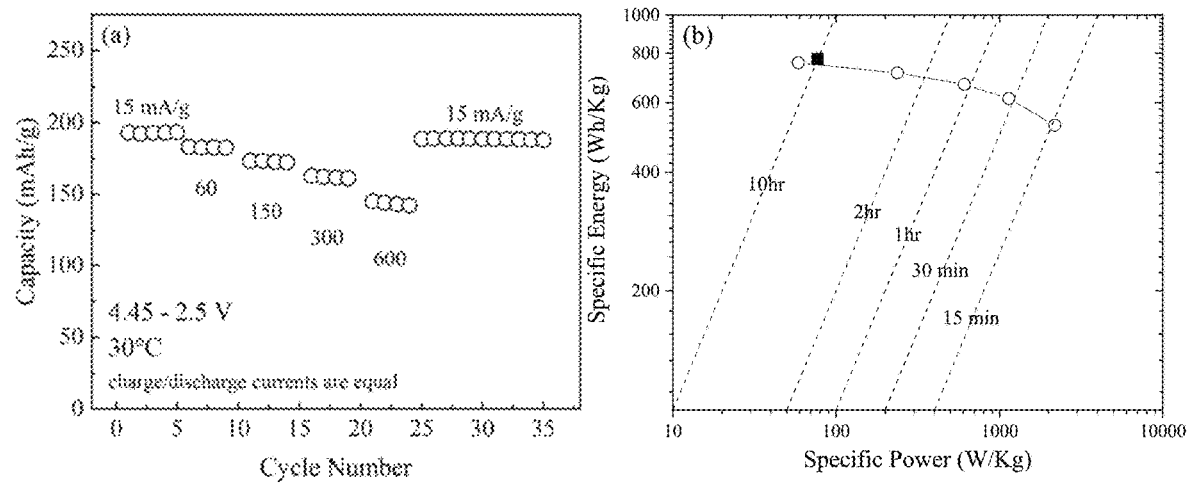
FIG. 5 shows (a) rate data of the LC-NMC cathode conducted between 4.45-2.5 V at 30° C. Charge and discharge currents were the same and are as listed in the plot (mA g$^{-1}$); and (b) Ragone plot derived from the data in (a), based on active weight of the cathode only.

The amplitude of the correlations just below about 4 Å in FIG. 4, panel (b) are of particular significance. The intensity here can be attributed to Ni—O—Ni bonds arising from Ni located in the lithium layers of these layered oxides and is a direct indication of Li/Ni exchange. The LC-NMC shows correlations on par with the commercial NMCs. Xiao et al. (Xiao, Y. et al. *Insights into the origin of lithium/nickel ions exchange in layered Li(Ni$_x$Mn$_y$Co$_z$)O$_2$ cathode materials*, Nano Energy, 49 (2019) 77) have recently quantified the Li/Ni exchange of NMC-622, 532, and 442 using neutron and magnetic measurements and found values of just about 3-4% for these compositions. The EXAFS data of FIG. 4 corroborates an equally well-layered structure for the LC-NMC and confirms less than 5% Li/Ni exchange. This observation is further reflected in the data of FIG. 5, panel (a) showing the excellent rate capability of the LC-NMC. Rate data was collected between 4.45-2.5 V at 30° C. with charge and discharge rates being equal, as listed in the plot (mAh g$^{-1}$). The LC-NMC delivers 75% of its initial capacity (about 190 mAh g$^{-1}$ at 15 mA g$^{-1}$) at a rate of 600 mA g$^{-1}$ (about 4 C, where C is defined by the actual time taken to discharge the cell at a given rate) revealing the facile diffusion of Li in structure on both charge and discharge. It has been previously established that rate performance decreases with increasing Li/metal exchange and the data of FIG. 5, panel (a) along with the XAS data of FIG. 4 verify the well-layered nature of the LC-NMC. We note here that active material loadings were kept low (about 5 mg cm$^{-2}$) in order to study the inherent cathode-particle properties. A Ragone plot derived from the data in 5(a) is shown in FIG. 5, panel (b). For a rough estimate of performance, the filled square shows data of a commercial NMC-622 at the 10-hour rate (4.4 V cutoff) taken from Ahmed, S.; Trask, S. E.; Dees, D. W.; Nelson, P. A.; Lu, W.; Dunlop, A.; Polzin, B. J.; Jansen, A. N. *Cost of automotive lithium-ion batteries operating at high upper cutoff voltages*, J. Power Sources, 403 (2018) 56.

Figure 6:
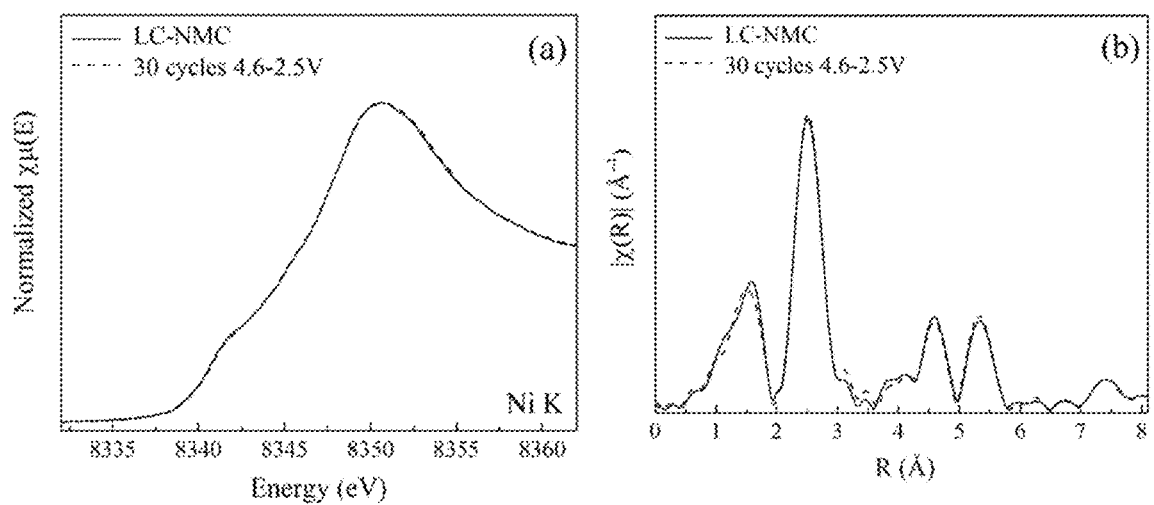
FIG. 6 shows Ni K-edge XANES (a) and magnitude of the Fourier transformed EXAFS (b) before and after cycling of the LC-NMC cathode between 4.6-2.5 V (vs. Li/Li$^+$) for 30 cycles.

FIG. 6, panels (a) and (b), show Ni K-edge XANES and magnitudes of the Fourier transformed EXAFS data before and after cycling of the cathode between 4.6-2.5 V (vs. Li/Li$^+$) for 30 cycles. Clearly, the average oxide structure and local bonding arrangements have not been substantially damaged after, in agreement with the electrochemical results above. Similar data was obtained for the Mn and Co edges (not shown) corroborating the stability of the bulk cathode structure under high-voltage cycling.

Figure 7:
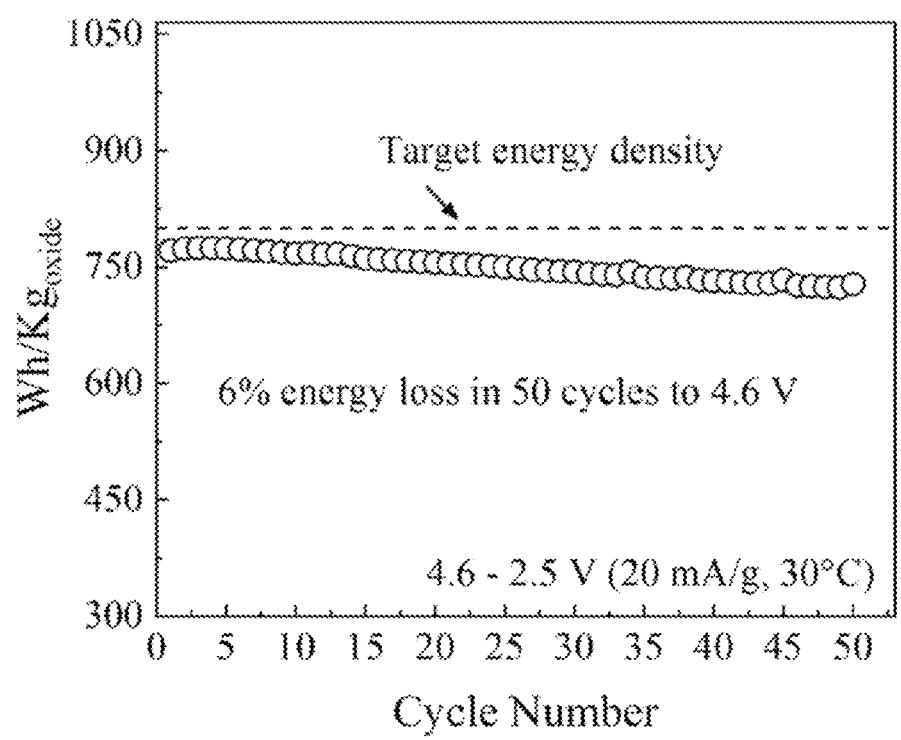
FIG. 7 shows oxide specific discharge energy (Wh kg$^{-1}$) for the LC-NMC cathode cycled between 4.6-2.5 V (Li/Li$^+$).

FIG. 7 shows a plot of oxide-specific, discharge energy (cathode only, Wh kg$^{-1}$ oxide) from a cell cycled between 4.6-2.5 V (Li/Li$^+$). This cathode, when paired with a Li metal anode, achieved an initial specific discharge energy of approximately 770 Wh kg$^{-1}$ and an average of about 750 Wh kg$^{-1}$ over the 50 cycles on test. The dashed line labeled "Target energy density" represents an oxide-specific energy of 800 Wh kg$^{-1}$. The X-ray absorption data of FIG. 6 shows that the fade observed is not due to significant structural changes. In this case, surfaces issues are the likely source of fade. Well-known phenomena such as metal dissolution and impedance rise must be overcome, as with all current NMCs, to maintain the initial, high specific energy of the LC-NMC.

Example 4. Electrochemical Cells and Batteries

Figure 8:
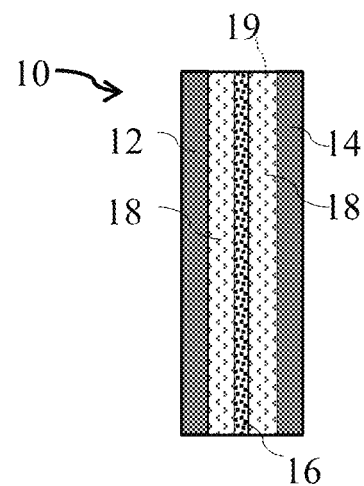
FIG. 8 depicts a schematic representation of an electrochemical cell.
Figure 9:
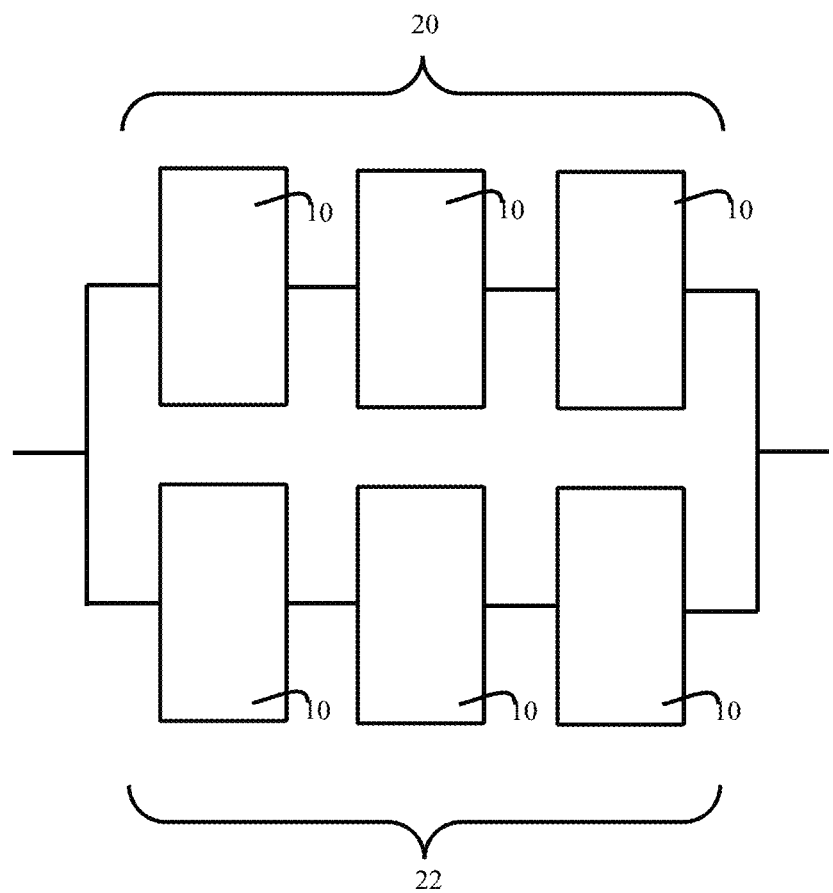
FIG. 9 depicts a schematic representation of a battery consisting of a plurality of cells connected electrically in series and in parallel.

FIG. 8 schematically illustrates a cross-sectional view of a lithium-ion electrochemical cell 10 comprising first electrode 12 comprising a lithium metal oxide active material as described herein, and a second electrode 14, with separator 16 therebetween. A lithium-containing electrolyte 18, comprising a solution of a lithium salt in a non-aqueous solvent, contacts electrodes 12 and 14 and separator 16. The electrodes, separator and electrolyte are sealed within housing 19. FIG. 9 schematically illustrates a lithium-ion battery comprising a first array 20 consisting of three series-connected electrochemical cells 10, and a second array 22 consisting of three series-connected electrochemical cells 10, in which first array 20 is electrically connected to second array 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A layered lithium metal oxide (LMO) material comprising a lithium metal oxide of empirical formula $xLi_2MnO_3 \cdot (1-x)LiNi_{0.5+\delta/2}Mn_{0.5-\delta}Co_{\delta/2}O_2$, wherein $0 < x \le 0.1$; and $0.05 \le \delta \le 0.2$.

2. The layered LMO material of claim 1, wherein $0.02 \le x \le 0.08$.

3. The layered LMO material of claim 1, wherein $0.03 \le x \le 0.07$.

4. The layered LMO material of claim 1, wherein $0.07 \le \delta \le 0.15$.

5. The layered LMO material of claim 1, wherein $0.02 \le x \le 0.08$; and $0.07 \le \delta \le 0.15$.

6. The layered LMO material of claim 1, wherein $0.03 \le x \le 0.07$; and $0.07 \le \delta \le 0.15$.

7. The layered LMO material of claim 1, wherein x is 0.05, and δ is 0.1.

8. An electrochemical cell comprising an anode, a cathode comprising the layered LMO material of claim 1, an ion-conductive separator between the anode and the cathode, and an electrolyte comprising a lithium salt dissolved in a non-aqueous solvent contacting the anode, the cathode, and the separator.

9. A battery comprising a plurality of the electrochemical cells of claim 8 electrically connected in series, in parallel, or in both series and parallel.

* * * * *